Dec. 4, 1945.  W. A. HENKLE  2,390,254
MILLING CUTTER UNIT AND ASSEMBLY
Filed Oct. 18, 1941  6 Sheets-Sheet 1
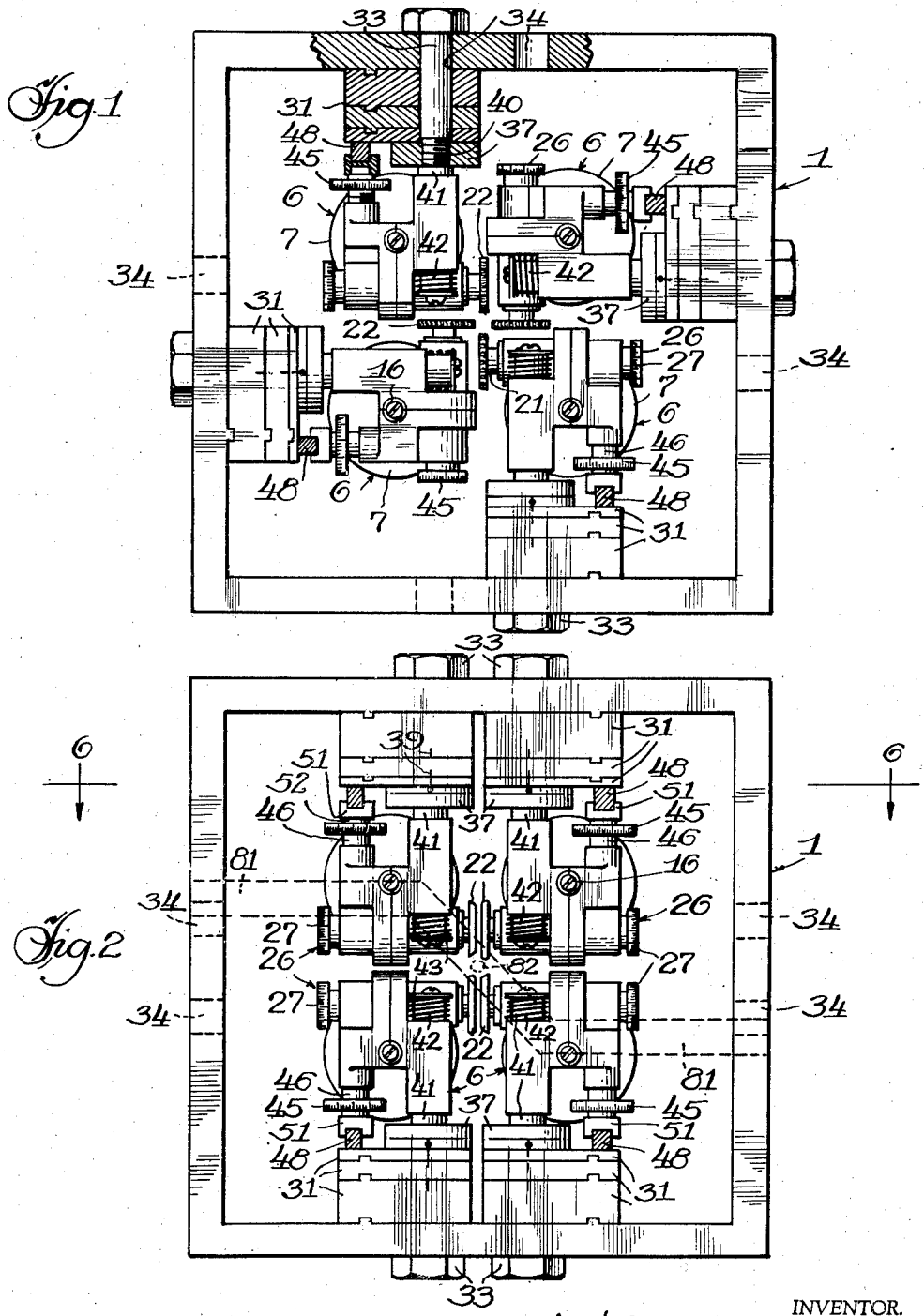
INVENTOR.
William A. Henkle
BY Parkinson + Lane
Attys.
Witness:

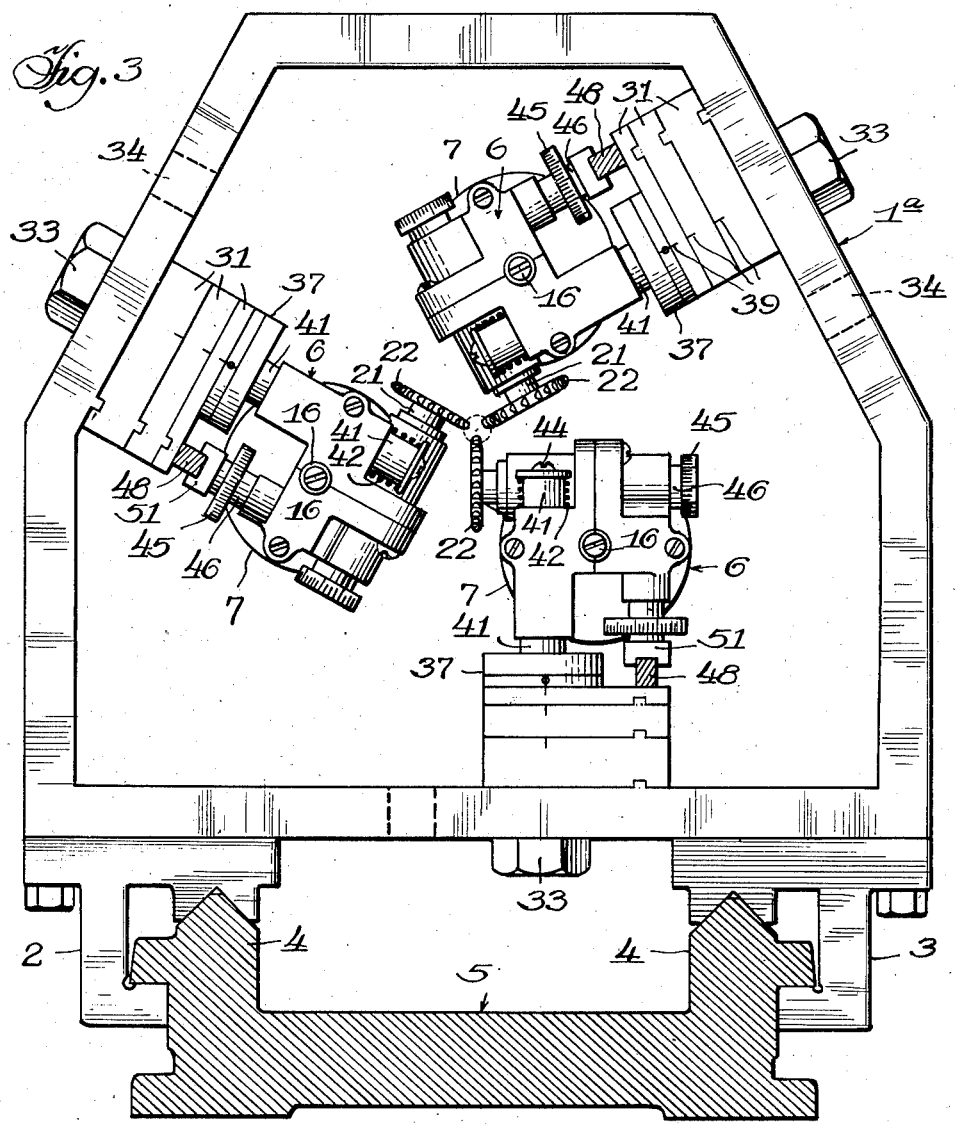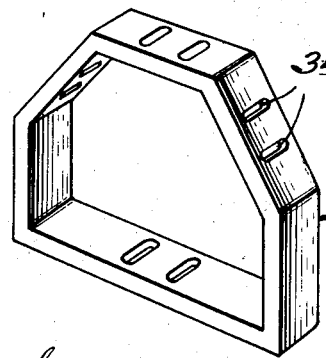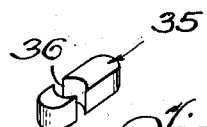

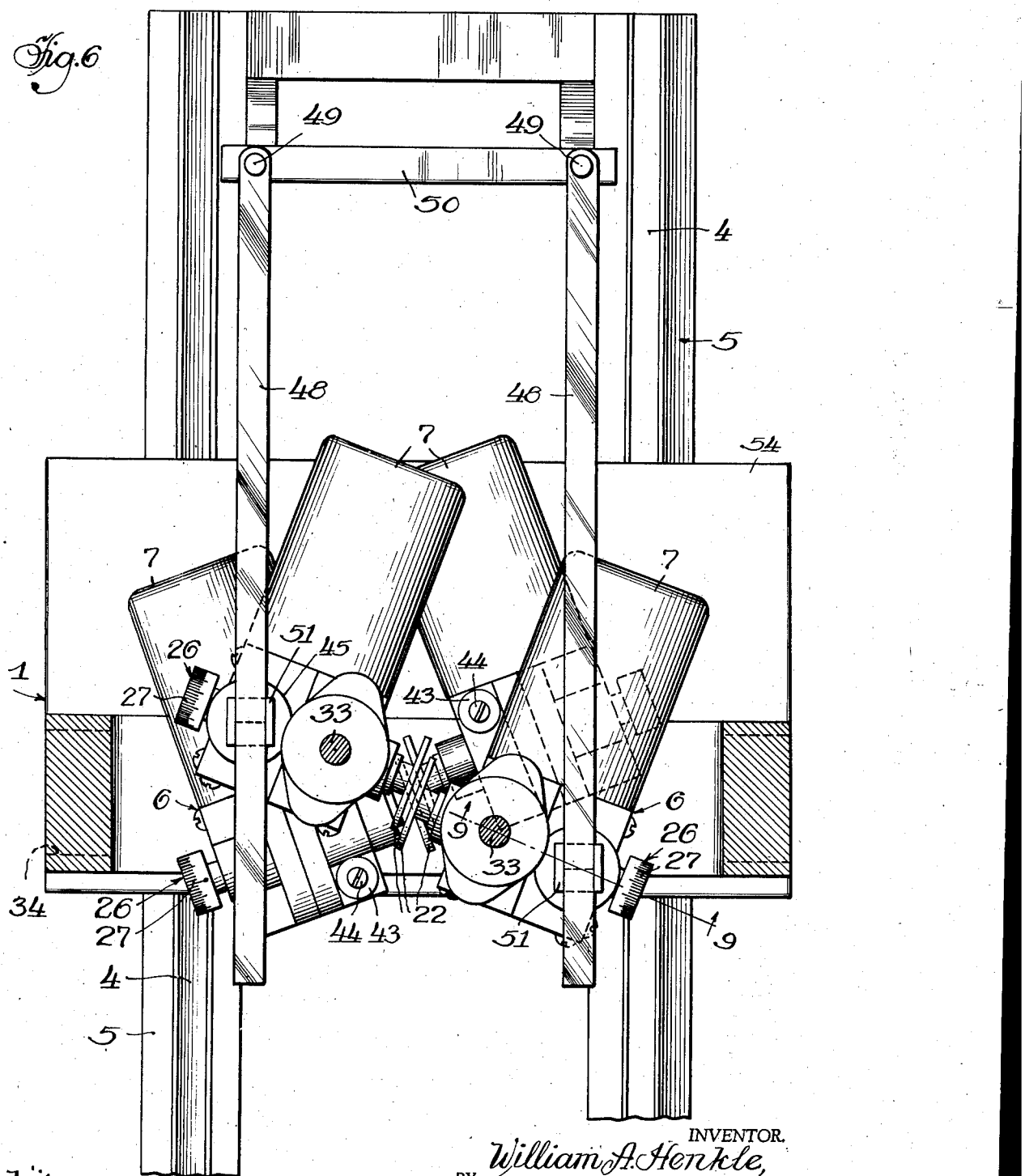

Dec. 4, 1945. W. A. HENKLE 2,390,254
MILLING CUTTER UNIT AND ASSEMBLY
Filed Oct. 18, 1941 6 Sheets-Sheet 4

INVENTOR.
William A. Henkle
BY Parkinson & Lane
Attys

Witness:
Chas. R. Hursh

Dec. 4, 1945.  W. A. HENKLE  2,390,254
MILLING CUTTER UNIT AND ASSEMBLY
Filed Oct. 18, 1941  6 Sheets-Sheet 5
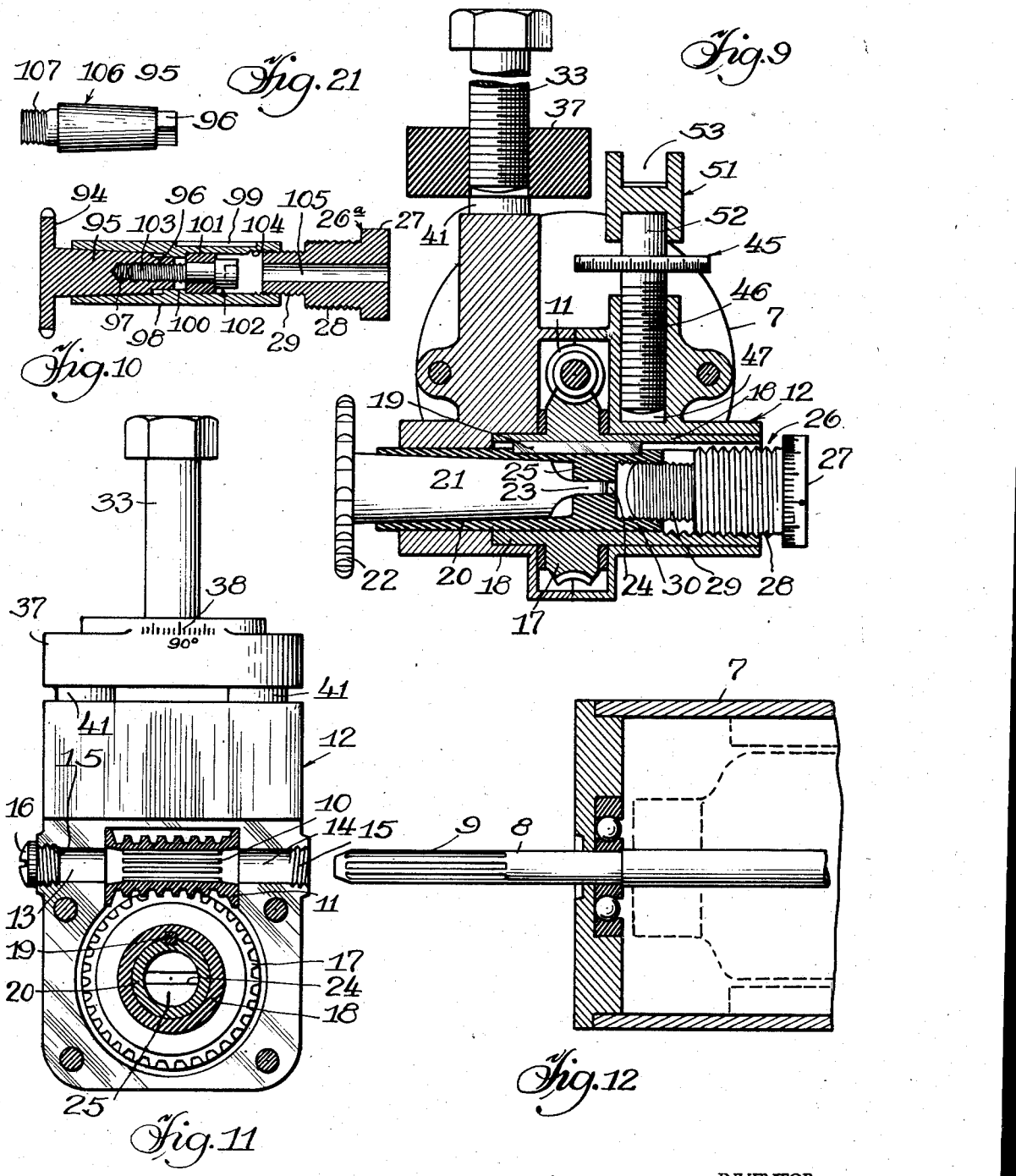
INVENTOR.
William A. Henkle
BY Parkinson & Lane
Attys.
Witness:
Chas. R. Hursh

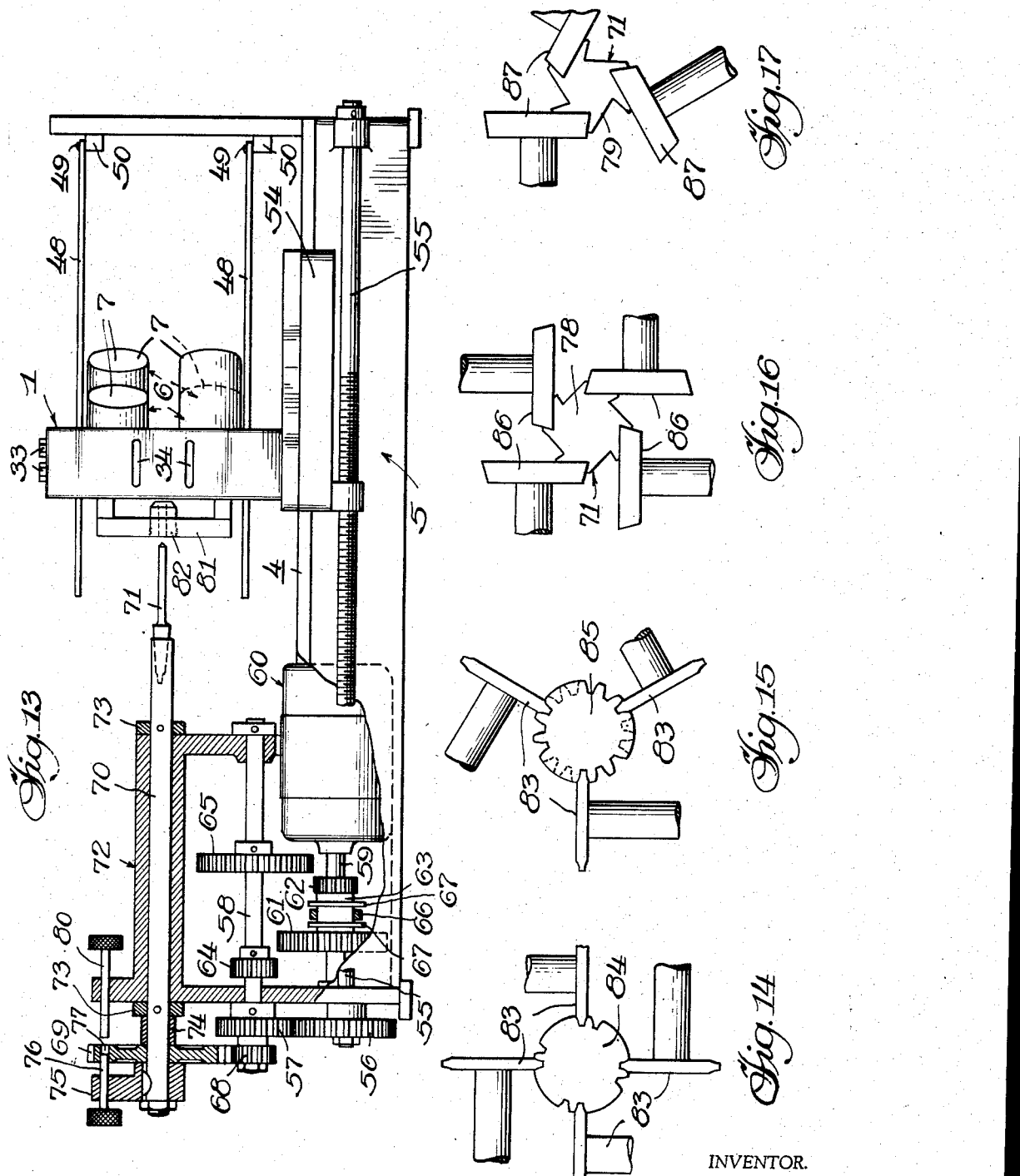

Patented Dec. 4, 1945

2,390,254

UNITED STATES PATENT OFFICE 2,390,254

MILLING CUTTER UNIT AND ASSEMBLY

William A. Henkle, Chicago, Ill.

Application October 18, 1941, Serial No. 415,531

12 Claims. (Cl. 90—13.9)

The present invention relates to a novel milling cutter unit and assembly so constructed and arranged as to more effectively and rapidly perform the necessary operations in the production of gears, worms, milling cutters, twist drills, reamers, taps and other tools or articles, whether of metal, plastic or other composition. The novel assembly comprises a plurality of power driven milling cutter units adjustably mounted in a frame or support in such manner that the units may be disposed in any desired or required group arrangement. In this frame or support multiple units may be disposed in opposed or any angular relationship for performing the milling operations.

The invention further comprehends a most compact milling machine capable of greater utility than prior machines and resulting in a greatly increased output over such prior devices. The present construction permits the operator to perform multiple or combined operations simultaneously, as well as like or unlike operations including cutting right or left hand spirals, straight milling, cutting, sawing, fluting, slotting or channelling with suitably shaped milling cutters, circular saws, etc., on the more commonly known items such as gears, worms, cutters, twist drills, reamers, taps, etc.

In the novel assembly each milling cutter unit is independently adjustable to numerous positions with respect to its frame or mounting and in its relation to the lathe bed ways or rails. Each unit is provided with a reversible head which greatly increases its utility, and is also provided with a novel arbor assembly facilitating the changing of tools of different sizes and shapes and for different operations, thereby permitting multiple operations and saving considerable time in making setups.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in front elevation of a novel assembly in which four units are arranged in a manner as for cutting gears and the like.

Figure 2 is a view similar to Figure 1 but with the units arranged in pairs in right and left hand relationship.

Figure 3 is a view similar to the preceding views but with an alternate frame or bracket construction adapted to mount three units arranged and supported approximately 120° apart.

Figure 4 is a view in perspective of the frame or support of Figure 3.

Figure 5 is a view in perspective of an adapter for adjusting the position of each unit in the frame.

Figure 6 is a plan view but taken in a plane represented by the line 6—6 of Figure 2, showing four cutters in offset or angular relationship, as for cutting a twist drill.

Figure 9 is an enlarged view in vertical cross section taken in a plane represented by the line 9—9 of Figure 6.

Figure 10 is a view in vertical cross section of an alternate construction of adjustable arbor assembly for mounting the cutting tool.

Figure 11 is a view, part in side elevation and part in vertical cross section, of a unit with the motor and motor drive shaft removed.

Figure 12 is a view in vertical cross section taken longitudinally through the motor housing and showing the splined drive shaft ready to be inserted into the worm of the unit.

Figure 13 is a view, part in side elevation and part in vertical cross section, of a lathe or the like equipped with the novel assembly.

Figures 14 to 17 inclusive, are diagrammatic views in end elevation showing assemblies of four and three cutters arranged for cutting teeth in gears, reamers and the like, the number of cutters employed depending upon whether the ultimate number of teeth are multiples of four or three, and the last two figures showing the manner of arranging the tools to undercut the teeth, as for example, in spiral fluted reamers.

Figure 7:
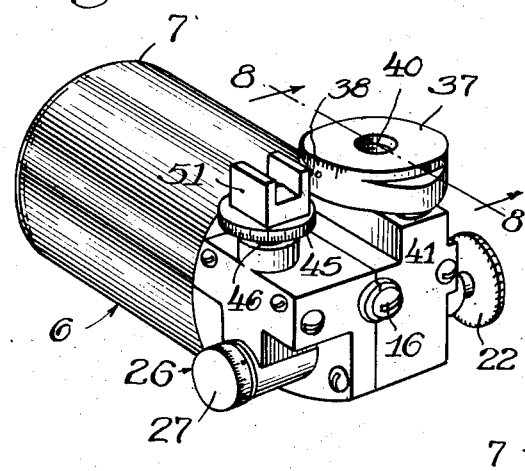
Figure 7 is a view in perspective of one of the novel cutting units.
Figure 8:
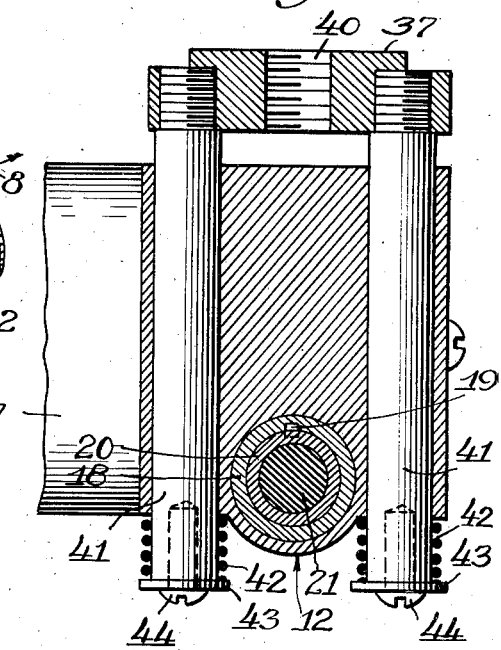
Figure 8 is an enlarged view in vertical cross section taken in a plane represented by the line 8—8 of Figure 7.
Figure 18:
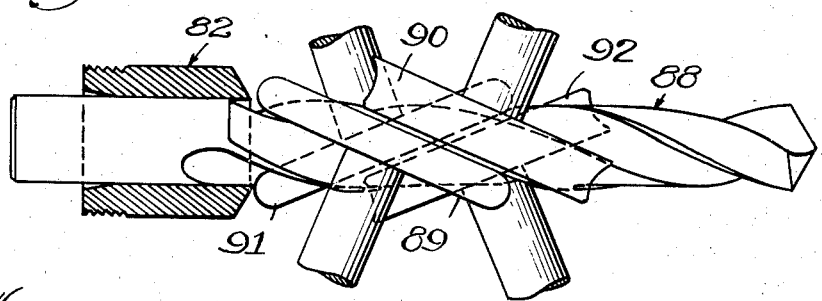

Figure 18 is a fragmentary top plan view showing a twist drill and the arrangement of the cutting tools for cutting the flutes and lands of the drill.

Figure 19:
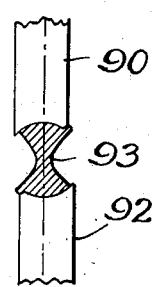

Figure 19 is a view in end elevation showing the position of the top and bottom land cutters, the twist drill being shown in vertical cross section.

Figure 20:

Figure 20 is a view similar to Figure 19 but showing the position of the top and bottom flute cutters.

Figure 21 is a view in side elevation of an arbor for a cutting, buffing, polishing or grinding wheel.

Referring more particularly to the illustrative embodiment selected to illustrate the novel invention, the novel milling cutter assembly is shown as adapted to be mounted in a frame or bracket support 1 as in Figures 1 and 2, or 1a as in Figure 3, the frame or bracket support attached to a table or carriage secured to brackets 2 and 3 movable upon the spaced ways or rails 4 of a lathe or the like. To operate the assembly in association and synchronism with the index gear arrangement on the bed 5 of the lathe, the assembly consists of multiple units 6 each comprising a reversible motor with speed reducing unit and gear transmission. Each unit as more particularly disclosed in Figures 7 to 12 inclusive of the drawings, comprises a motor 7 having a drive shaft 8 splined at its outer end 9 so as to be received in and interlock with the splined interior 10 of a worm 11 rotatably mounted within the housing 12. This worm is positioned in the housing in alignment with opposed openings 13 and 14 threaded at 15 to receive a threaded plug or closure 16. These openings permit the motor drive shaft 8 to be inserted through either opening 13 or 14 so as to drive the cutting unit in either direction as desired or required for the particular use or operation intended.

The worm 11 is in meshing engagement with a worm wheel 17 having a hub 18 keyed at 19 to a sleeve 20. This sleeve has a tapered interior for the reception of a tapered shank 21 of a cutting tool 22 adapted for cutting or milling the desired teeth in a gear, worm, twist drill, reamer, tap or the like. The shank at its inner end is shown as reduced to a flattened portion 23 adapted to be received in a slot 24 formed in a connecting wall 25 of the sleeve. It will thus be seen that the shank 21 and its tool 22 are forced into the sleeve and retained thereat and against rotation by the flattened portion or lip 23 engaged in the slot 24.

Means are provided for adjusting the arbor and tool longitudinally within the housing 12. This is accomplished by means of the adjusting micrometer screw 26 having a micrometer head 27 suitably marked about its circumference or periphery with graduations indicating degrees for proper adjustment of the tool with respect to a designated marking provided on an adjacent portion of the housing 12. This micrometer screw is provided with a shank having an enlarged threaded portion 28 threaded in the hub 18 of the worm wheel and a reduced and finely threaded portion 29 received in the threaded portion 30 of the sleeve 20. Thus, by manipulating the micrometer head 27, the sleeve 20 may be adjusted in either direction to properly adjust and locate the tool 22.

In order to adjust each unit toward or away from the work being operated upon, or at an angle approximating 90° with respect to the axis of the tool, the invention comprehends the use of a plurality of blocks 31 (see Figures 1, 2 and 3), each of varying thickness and each provided with a tongue and groove arrangement to prevent their becoming disengaged and to further prevent relative movement therebetween. These blocks permit a depth adjustment within certain limits. Additional adjustment is provided by the threaded bolt 33 which supports each unit in the frame 1 or 1a, each frame being provided with a plurality of elongated slots 34 for the reception of a bolt. These slots are more clearly shown in Figure 4 of the drawings, and in order to prevent the bolt 33 from moving in the slots, the invention comprehends the use of an adapter 35 of any suitable shape such as that shown more clearly in Figure 5. The external contour of each of these adapters is that of the elongated slot in which it is to be received, with the parts of the adapter provided with an opening 36 therebetween having the contour of the shank of the bolts 33. It will thus be seen that the adapter may be located in the position shown in Figure 5, or it may be reversed from that position to locate the bolt in another adjusted position transverse of the frame. The blocks 31 may be employed for major depth adjustments by the stepped arrangement, while adapters 35 of variously located openings 36 permit numerous adjustments of the bolt 33 transverse of the frame.

A collar 37 is shown as provided with graduations 38, and each of the blocks 31 is provided with an indication 39 to indicate the angular relationship between the unit and its support, which relationship is maintained by the bolt 33. This collar is interiorly threaded at 40 (see Figure 8) and is mounted at the upper end upon spaced rods 41 slidably mounted in the housing 12. A spring 42 encompasses the opposite ends of each of these rods with one end of the spring seating against the housing and the other end against a washer 43 secured by a screw or the like 44 upon the rod. Thus, these rods are always held under tension.

To permit minute or vernier depth adjustment, the invention comprehends a micrometer screw 45 having its shank 46 threaded and received in a threaded opening 47 provided in the housing 12. This will permit a raising and lowering of the housing as shown in Figure 9 with respect to the fixed and spaced rods 41 and similar movement of the tool with respect to the work to be operated upon. A further depth adjustment of the housing and tool is provided by means of a bar 48 (see Figure 6) free at its one end but having its other end pivotally mounted at 49 upon a cross bar 50. This bar 48 at its upper surface contacts the spacer blocks 31 and is adapted to be conformably received and guided in a block 51 pivotally mounted upon the upper end 52 of the micrometer screw 45 and having its upper end slotted at 53 for the reception of the bar. This bar and block provide a guide for movement of the assembly upon the lathe bed 5, to control the depth of cut of the tool. Where the assembly is employed for cutting a tool such as a twist drill or tapered reamer in which the web is of varying thickness, the under surface of each bar is so contoured or inclined as to accomplish this, and this incline or contour is translated to the cutters to thereby gradually increase the thickness or depth of the web of the twist drill. Thus the contour or incline of the bar will determine the depth of the cut. In order to eliminate unnecessary friction between the bar and the block 51, Figure 9 shows a ridge or rib in the slot 53 to provide a line contact therebetween. It is to be understood that the springs 42, and the work being operated upon, forces the housing upwardly against the block 51 and guide bar 48.

Figure 13 discloses the novel assembly applied to a lathe or the like with four of the units 6 located in the arrangement and relationship shown in Figure 6. In this arrangement, the frame 1 for the units 6 is mounted upon a table or support 54 longitudinally movable upon the rails or ways 4 and controlled by means of a feed screw 55. Upon one end of the feed screw is mounted a pinion or gear 56 meshing with a pinion or gear 57 keyed to the shaft 58. The shaft 59 of the speed reducing motor unit 60 is provided with a gear set comprising a pair of gears or pinions 61 and 62 secured upon a sleeve 63 suitably keyed to the motor shaft 59 so as to rotate therewith but slidable thereon to permit movement of the gear 61 into mesh with a gear or pinion 64 secured to the shaft 58, or the gear 62 into mesh with a gear or pinion 65 also secured to the shaft 58. In order to shift the sleeve 63 and its gears 61 and 62, this sleeve is provided with a shifting collar 66 located between a pair of peripheral flanges 67 mounted upon the circumference of the sleeve. Current is supplied to the motor unit 60 and to the motor units 6 through any suitable switching mechanism.

In the operation disclosed, shifting the collar 66 and sleeve 63 brings gear 62 into mesh with its respective gear or pinion 65 and the shaft 58 is rotated. This shaft in turn rotates the gears 57 and 68, the former rotating the feed screw 55 and causing the table 54 to advance, and the latter in mesh with and adapted to rotate a gear or pinion 69 free upon the work spindle 70 carrying the blank 71 to be operated upon. The work spindle is rotatable within the housing 72 but held against longitudinal movement with respect to the housing by means of collars 73 pinned to the shaft. The gear or pinion 69 is normally free to rotate upon the work spindle between the spacer sleeve 74 and the indexing lever or arm 75, the latter being keyed to the spindle, but this gear is adapted to be locked or clutched to the spindle by means of an indexing pin 76 adapted to be received in one of a series of indexing notches or openings 77 provided in the gear 69.

This arrangement is adapted primarily for cutting spiral flutes such as on an eight-fluted reamer 78 as diagrammatically shown in Figure 16 of the drawings, or a six-fluted reamer 79 as shown in Figure 17. When the desired length of reamer has been cut in the blank 71, the shifter collar 63 is moved to neutral position to disengage the gear 62 from the gear 65. The motor unit 60 is then reversed and the collar 66 is moved in a direction to engage the gear 61 with the gear 64 on the shaft 58, thereby causing rapid rotation of the gear 56 and the feed screw 55 for causing movement of the table 54 away from the reamer blank. If reamers such as shown in Figures 16 and 17 are to be cut, it being understood that these completed reamers have eight and six flutes respectively, two separate cuts must be taken in order to provide the required number of flutes. In that event, after the table has been rapidly moved away from the partly cut reamer blank in which the initial four or three cuts have been completed, the motor unit 60 is again stopped, and the index pin 76 is withdrawn from the indexing gear 69 and moved to a succeeding notch or opening 77 which brings the partly cut reamer into proper alignment for its finishing cuts. A similar procedure is followed in cutting or milling a twist drill, depending upon the number of flutes with or without lands desired and the number of cutters employed, it being understood that if the number of flutes with or without lands is the same as the number of cutters used, but one cutting operation is required.

It is to be further understood that the above mentioned gear arrangement is so related that the indexing gear 69 is rotated slowly in synchronism with the movement of the cutter units upon the table 54 actuated and controlled through the feed screw 55. The unit 60 is preferably driven by a slow speed motor or by one having the required speed reducing mechanism, and the intermeshing gears 62 and 65, 57 and 56, and 68 and 69 are so related and have a predetermined tooth ratio to give the desired speed of operation. In addition, the spacing and number of openings or notches 77 in the indexing gear 69, permit accurate adjustment and proper division of the spiral teeth, flutes, etc. to be cut in the gear, reamer or other blank being operated upon.

In cutting a reamer having straight flutes, or in cutting other tools with straight flutes or teeth, the gear 68 is removed from the shaft 58 and the indexing pin 80 located in the stationary housing 72 is inserted into a notch or opening in the indexing gear 69 in order to lock this gear against rotation. Thereafter the same sequence of operation takes place; i. e., the starting of the motor unit 60, the meshing of the gears 62 and 65 to rotate the feed screw 55 and feed the table 54 and cutters to the blank to be cut, the subsequent reversal of the motor unit 60, and the meshing of the gears 61 and 64 in order to rapidly retract the feed table 54. In order to guide the blank and retain it in proper position for the cutting operation, the invention comprehends the provision of a guide 81 having a centrally located guideway 82.

Figure 14 discloses diagrammatically the use of four cutters 83 for cutting the teeth of a tool 84 such as a gear or the like having teeth which in number are multiples of four. Figure 15 is a similar arrangement of three cutters 83 for cutting or milling the teeth of a gear or the like 85 having a number which is a multiple of three.

Figure 16 shows four cutters 86 for cutting the flutes of an eight-fluted reamer 78, while Figure 17 shows a similar arrangement but of three cutters 87 for cutting the flutes of a six-fluted reamer. It is to be understood that any feasible number of units may be employed depending upon the number of teeth or cuts to be taken. For example, if a gear is to be produced with twenty-two teeth, two cutters would be employed. The only limitation as to the number of cutters employed, would be the space required for their operation.

In Figures 18, 19 and 20 there is shown an arrangement comprising two flute cutters and two land cutters arranged at suitable angles to mill a twist drill 88. The top flute cutter 89 is shown disposed adjacent the top land cutter 90 while the bottom flute cutter 91 is disposed adjacent the bottom land cutter 92. As explained above, where the web 93 of the drill is to be of varying thickness, the bars 48 of the flute cutters 89 and 91 are so contoured or inclined as to determine the ultimate depth of the cut and thickness of the web. In the same manner, the bars 48 for the land cutters 90 and 92 may be inclined where it is desired to vary the dimensions of the land.

In cutting spiral gears, the procedure followed will be similar to that in cutting the spiral fluted reamers as explained above.

Figure 10 discloses an alternate construction of assembly for adjustably mounting the shank of the cutting tool. In this assembly there is provided a cutting or milling tool 94 mounted upon a tapered shank 95 having its inner end reduced and given a squared or polygonal contour at 96 and threaded at 97. The encompassing sleeve 98 is provided with a keyway 99 in its circumference permitting it to be keyed to the worm wheel 17. The interior of the sleeve is so contoured at 100 to provide a square or polygonal opening for receiving the complementary squared or polygonal end 96 of the shank 95. Located within the sleeve 98 and adapted to abut a shoulder formed adjacent the opening 100 is a slip-in spacer 101 having an opening adapted to receive the shank of an adjusting screw 102 having a threaded end 103 receivable in the threaded portion 97 of the shank 95. The sleeve 98 is additionally threaded at 104 for reception of the threaded end 29 of a micrometer screw 26ᵃ similar to that shown in Figure 9. The enlarged threaded portion 28 of this screw is adapted to be threaded into the hub 18 of the worm wheel 17. A longitudinally extending opening 105 is provided in the micrometer screw for the insertion of a tool or instrument having an end which is received in the slotted outer end of the adjusting screw 102.

Turning the screw 102 in one direction will retract the shank 95 into an anchored position, the squared or polygonal portions 96 and 100 preventing the shank from rotating with respect to the sleeve 98. When it is intended to remove the cutting tool 94 and its shank 95, the screw 102 is turned in the opposite direction to withdraw this screw. When the head of this screw abuts the inner end of the micrometer screw 26ᵃ, further turning thereof in the same direction, due to the screw 102 being prevented from further withdrawal, forces the shank 95 outwardly until it is released from threaded engagement with the screw.

Figure 21 shows an arbor 106 of the type adapted for use with a grinding, buffing, polishing or cutting wheel. Except for mounting the desired wheel or tool on the threaded end 107, this arbor is similar in contour to the shank shown in Figure 10 and identical reference numerals have been applied.

Although I have shown the novel assembly and milling cutter units applied to a lathe bed, it is to be understood that the invention is not limited thereto but could be applied to or form an accessory or attachment for use on a milling machine or other machine in which provision is made for relative movement between a cutter or other tool and the work being operated upon.

It will be evident that my novel invention readily lends itself to other uses and may be associated with other mechanism. For example, a hollow spindle may be provided in the headstock with provision for mounting various holding devices, collets, chucks or face plates, which can be used for rods, tubes, etc., for internal or external work thereon and with or without the disclosed indexing method. The headstock may be similar to those commonly used on engine lathes with its back gears for the movement and operation of the carriage. A tailstock can be used for work supported between centers such as turning, thread cutting or grinding.

The control bar uprights with the cross bars 50 may be mounted on a base similar to a center rest for adjustment to different positions on the lathe bed ways. The units 6 may also be used in a frame or otherwise attached to the lathe carriage for rotating twist drills, reamers, taps, etc. for performing work held in a chuck, collet or on a face plate. The unit may also be used to drive the sleeve 20 with spiral gears at a speed greater than the motor shaft for grinding, polishing or buffing.

Where it is desired to reciprocate the frame 1 or 1ᵃ by the feed screw 55 and simultaneously maintain the rotating direction of the spindle 70, this may be accomplished by means of a set of reversing tumbler gears meshing with the gears 56 and 57, or by providing suitable gears and clutches for accomplishing this result.

Having thus disclosed the invention, I claim:

1. A milling cutter assembly comprising a frame adapted to be mounted on the bed of a lathe or the like and provided with a plurality of sides, a plurality of individual self-propelled and self-contained milling cutter units for forming tools such as gears, worms, twist drills, reamers, taps and the like, adjustably mounted in the sides of the frame, means for mounting a cutter unit in each side wall, means for individually adjusting each cutter unit with respect to its mounting, and means to individually guide each of the cutter units on the frame.

2. A milling cutter unit comprising a compact, self-powered and self-contained power drive assembly including a housing for mounting a cutting tool, drive mechanism in the housing for operating the cutting tool, a readily detachable motor carried by said unit and having a drive shaft adapted to be received at either side of the assembly for driving the mechanism and tool in the desired direction of rotation, and means for mounting the motor at either of the opposite sides of the housing.

3. A milling cutter unit comprising a compact, self-powered and self-contained drive assembly including a housing in which the milling cutter is adjustably mounted, drive mechanism in the housing and including a worm gear, and an arbor for mounting the milling cutter, said arbor including a sleeve adapted to be keyed to and driven by the worm gear, a milling cutter having a shank adapted to be received in the arbor, an adjusting screw having an enlarged threaded portion and finely threaded portion securing the sleeve in the worm gear and for adjusting the cutter longitudinally of its shank, a support for the cutter unit, and an adjusting screw on the housing for adjusting the housing and cutter with respect to the support and perpendicular to the axis of the shank.

4. In a milling cutter unit comprising a cutter assembly including drive mechanism having an internally splined worm for rotating the cutter at a desired speed and in either direction and a motor carried by the assembly and provided with a splined shaft adapted to be readily inserted in the splined worm for either side of the assembly and for rotating the cutter in either direction.

5. A milling cutter unit comprising a compact cutter assembly and a motor carried by the assembly for driving the same, said assembly including reversible drive mechanism having an internally splined worm adapted to be rotated in either direction and said motor being readily attached to or detached from the assembly and having a splined drive shaft adapted to be inserted into the splined portion of the worm from either side of the latter to drive the worm in either direction.

6. A milling cutter assembly comprising a plurality of individual cutter units each individually powered and driven, a work spindle for mounting a blank for a tool such as a twist drill, spiral fluted reamer or the like, an encompassing frame upon the interior of which the cutter units are adjustably mounted in inwardly disposed, spaced relation, means for adjusting the cutter units along or away from the sides of the frame, means for adjusting the cutter units in various angular relationship with each other, and mechanism for moving said frame and contained cutter units into cutting relation with the blank and rotating said blank in synchronism.

7. A milling cutter assembly comprising a plurality of individual, self-powered cutter units for cutting the flutes and lands of a twist drill, the spiral flutes of a reamer or the teeth of a gear, a work spindle for mounting a blank to be formed into a twist drill, reamer or gear, a frame for mounting the cutter units in spaced relation about the blank, means in the side walls of the frame for adjusting the cutter units along or inwardly of the frame, and drive mechanism for synchronously moving the frame and cutter units in unison into cutting relation with the blank and for rotating said work spindle and blank at a predetermined speed of rotation.

8. A milling cutter assembly for the production of a twist drill, comprising a frame, a plurality of individual, self-powered flute and land cutter units each adjustably mounted in a side wall of the frame and so disposed as to form the flutes and lands of a blank for a twist drill in a single operation and including a top flute cutter and a top land cutter disposed in adjacent relation above the twist drill blank and a bottom flute cutter and a bottom land cutter disposed in adjacent relation below the twist drill blank, a guide bar, and a guide block carried by each unit and maintained in contact with and guided by the undersurface of the guide bar, the undersurface of the guide bar being so contoured as to control the depth of cut of each unit through the cutting operation, guide means for the frame, and means for moving the frame on said guide means.

9. A milling cutter unit comprising a compact and self-powered assembly including a housing for mounting a cutting tool, drive mechanism in said housing for operating the cutting tool, a readily detachable motor having a drive shaft for driving the mechanism and thereby operating the tool in the desired direction of rotation, means mounting the motor at either of the opposite sides of the housing and means accessible from either of the sides of the housing for receiving the drive shaft of the motor to rotate the drive mechanism in either direction.

10. A milling cutter assembly comprising a supporting structure, a frame mounted for longitudinal movement on said supporting structure and provided with angularly arranged sides, a plurality of milling cutter units for forming tools such as gears, worms, twist drills, reamers, taps and the like mounted in angular relationship upon the sides and encompassed by the frame, means for adjusting the units with respect to the sides of the frame and at an angle with each other, and including a further adjustment for said units comprising means for mounting said units for movement and means for moving said units including a guide block carried by each unit, an elongated guide bar for each guide block, each guide bar mounted on said supporting structure and extending along the path of movement of said frame and at an angle thereto, and means for moving said frame and contained units longitudinally of said supporting structure whereby the guide blocks and bars will cooperate to move the cutter units relative to the work.

11. In a milling cutter assembly, a plurality of individual self contained and self powered cutting units for forming tools such as gears, worms, twist drills, reamers, taps and the like, an encompassing frame for housing the units and provided with angularly arranged sides, means for adjusting the units with respect to the sides of the frame and at an angle with each other, and including a further adjustment of said units comprising means for mounting said units for movement and means for moving said units including a guide block carried by each unit, an elongated guide bar for each guide block, each guide bar mounted on said supporting structure and extending along the path of movement of said frame and at an angle thereto, and means for moving said frame and contained units longitudinally of said supporting structure whereby the guide blocks and bars will cooperate to move the cutter units relative to the work.

12. In a milling cutter assembly, a plurality of individual self contained cutter units provided with cutting tools for forming articles such as gears, worms, twist drills, reamers, taps and the like, an encompassing frame for housing the units and provided with angularly arranged sides, means for adjusting the units with respect to the sides of the frame and at an angle with each other, and including a further adjustment of said units comprising means for mounting said units for movement and means for moving said units including a guide block carried by each unit, an elongated guide bar for each guide block, each guide bar mounted on said supporting structure and extending along the path of movement of said frame and at an angle thereto, and means for moving said frame and contained units longitudinally of said supporting structure whereby the guide blocks and bars will cooperate to move the cutter units relative to the work.

WILLIAM A. HENKLE.